(12) United States Patent
Irle et al.

(10) Patent No.: US 6,467,338 B1
(45) Date of Patent: Oct. 22, 2002

(54) POSITION SENSOR FOR A MOTOR VEHICLE

(75) Inventors: Henning Irle, Lippstadt; Norbert Kost, Geseke; Franz-Josef Schmidt, Salzkotten, all of (DE)

(73) Assignee: Hella KG Hueck & Co., Lippstadt (DE)

( * ) Notice: Subject to any disclaimer, the term of this patent is extended or adjusted under 35 U.S.C. 154(b) by 14 days.

(21) Appl. No.: 09/594,096

(22) Filed: Jun. 15, 2000

(30) Foreign Application Priority Data

Jun. 15, 1999 (DE) .......................... 199 27 152

(51) Int. Cl.⁷ .................. G01M 19/00; G01M 15/00
(52) U.S. Cl. ..................... 73/118.1; 73/117.2
(58) Field of Search ................ 73/116, 118.1, 73/118.2; 123/399

(56) References Cited

U.S. PATENT DOCUMENTS 4,915,075 A 4/1990 Brown
5,138,873 A * 8/1992 Amano ................ 73/118.1
5,681,990 A 10/1997 Hampo et al.

FOREIGN PATENT DOCUMENTS

EP 0386439 A3 9/1990
EP 0509484 A1 * 10/1992 ............ G01R/7/08

* cited by examiner

Primary Examiner—Benjamin R. Fuller
Assistant Examiner—Maurice Stevens
(74) Attorney, Agent, or Firm—Birch, Stewart, Kolasch & Birch, LLP

(57) ABSTRACT

A position sensor for a motor vehicle, which generates, as a sensor signal, a pulse-width modulated signal that varies as a function of position, has a total measuring range which is subdivided into multiple, similar, sequentially-adjacent, measuring sections. The position sensor of the invention provides error-free transition between the sequentially-adjacent measuring sections.

6 Claims, 2 Drawing Sheets

POSITION SENSOR FOR A MOTOR VEHICLE

This application claims a priority based on German patent application 199 27 152.6, filed Jun. 15, 1999, and the contents of that application are incorporated herein by reference.

This invention relates to a position sensor for a motor vehicle which generates, as a sensor signal, a pulse-width modulated signal that varies as a function of position.

A purpose of this invention is to provide a position sensor that measures over a wide angle or path range with a particularly high resolution. High-resolution measurement converters, for example analog-digital converters, can be used to encode sensor signals over a large position range with great accuracy. However, conceptually such converters are rather uncommon in the motor vehicle area and necessitate a relatively high degree of application effort, especially in adaptation to the sensors. Moreover they are comparatively expensive.

Another approach is to subdivide a total measuring range into several similar measuring ranges. To achieve the required high accuracy it is absolutely necessary to have error-free transition from one measuring range to the next.

With analog signal generation this is practically impossible, because even a small jitter at a transition border can lead to unacceptable errors. A conventional position sensor which generates a position-dependent-variable, pulse-width-modulated signal as a sensor signal (also abbreviated as PWM signal below) are similarly unsuitable, since they do not permit a signal range from 0% to 100%.

It is therefore an object of this invention to provide a position sensor that is capable of error-free transition between sequentially-adjacent measuring ranges.

SUMMARY OF THE INVENTION

According to principles of this invention, a total measuring range of a position sensor is subdivided into multiple sequentially-adjacent similar measuring sections, or sub-ranges, and the position sensor adds a fixed offset value to a digitalized measured value, such that a sum of a minimum possible measured value and the offset value corresponds to a pulse-width modulated signal with a minimum percentage modulation that is greater than 0%, and a sum of a maximum possible measured value and the offset value corresponds to a pulse-width modulated signal with a maximum percentage modulation that is less than 100%.

DETAILED DESCRIPTION OF THE INVENTION

Figure 1:
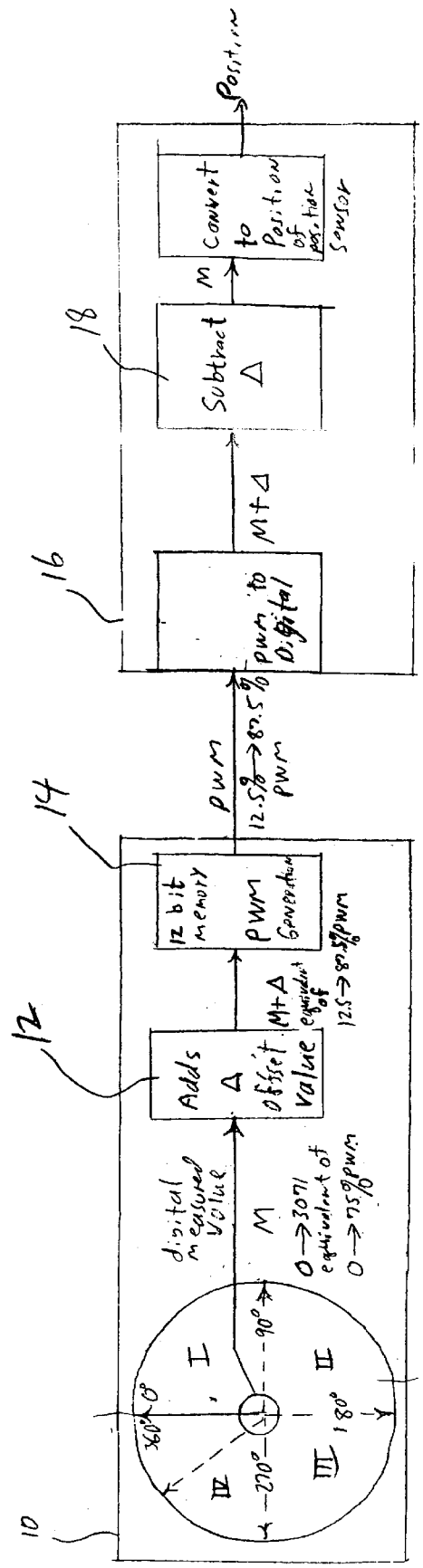
FIG. 1 is a block diagram of one embodiment of the invention.
Figure 2:
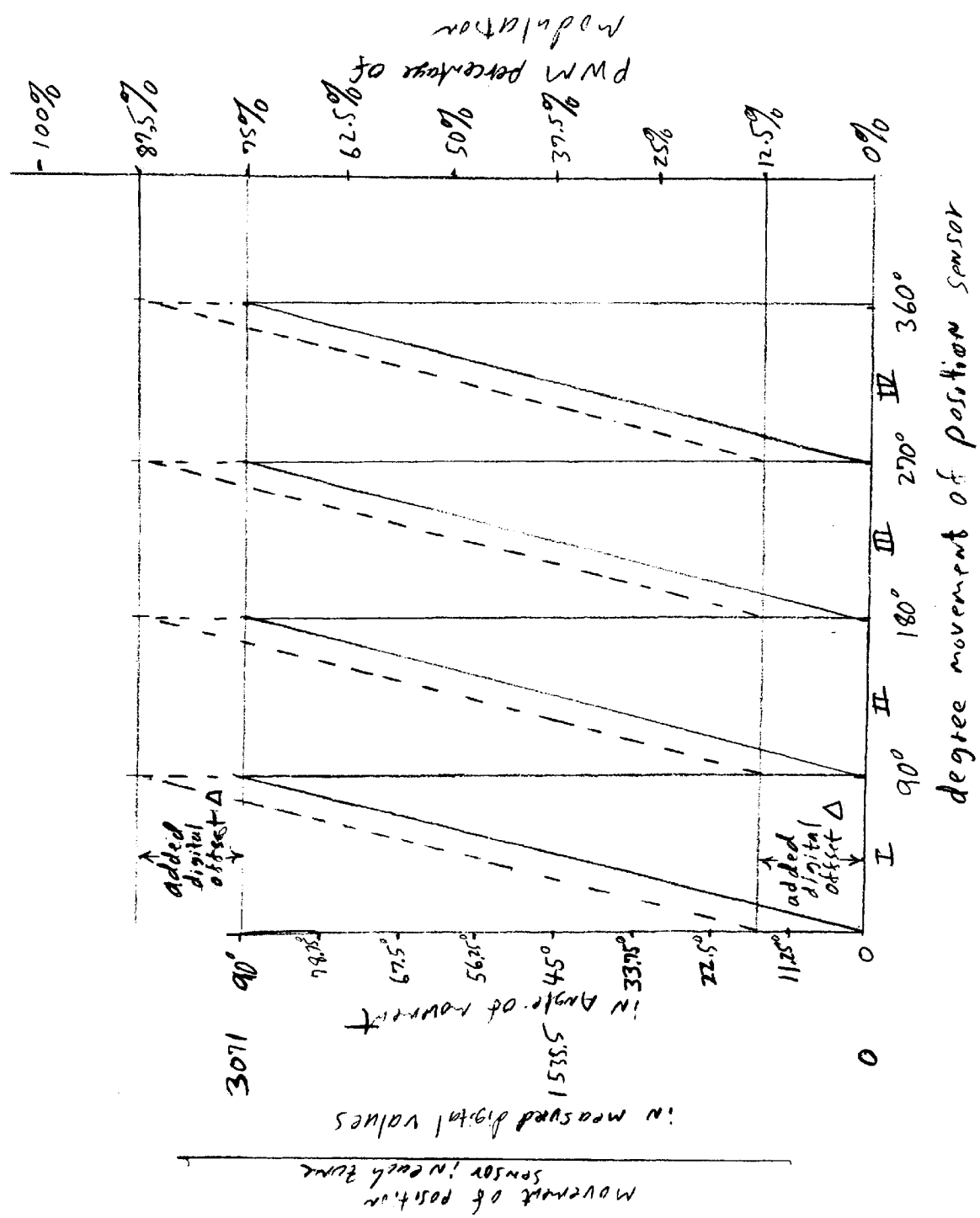
FIG. 2 is a chart illustrating operation of the device of FIG. 1.

A position sensor 10 for a motor vehicle generates, as a sensor signal, a pulse-width modulated signal that varies as a function of position. A total measuring range of the position sensor is subdivided into multiple sequentially-adjacent similar measuring ranges I, II, III and IV. The position sensor adds a fixed offset value Δ to a digitalized measured value M such that a sum of a minimum possible measured value and the offset value corresponds to a pulse-width modulated signal with a minimum percentage modulation that is greater than 0%, and a sum of a maximum possible measured value and the offset value corresponds to a pulse-width modulated signal with a maximum percentage modulation that is less than 100%.

A sensor of the invention therefore has multiple, repeating, measuring ranges, or sub-ranges, over a total signal range (that is, a rotational range of an angle sensor through 360°) without any gaps and provides a measured value of displacement, or angle, in the form of a pulse-width modulated measure signal. A noteworthy feature is that this pulse-width-modulated measure signal does not encounter a PWM limitation when an upper or lower limit of a measuring range is exceeded. Such a limitation is necessary with conventional position sensors, because PWM ratios of 0% or 100% correspond to D.C. voltage values and no further PWM measurement is then possible.

To nevertheless permit a trouble free transition from one measuring range to the next, a suitable fixed offset A is added to the actual measured value M before the PWM conversion so that, for example, at a measured value M of 0% the PWM value corresponds to the minimum value (=offset value Δ of, for example, 12.5%). Furthermore, the maximum possible PWM value is established by having the offset value+ maximum measured value reach, for example, only 87.5% of the possible PWM value.

In an embodiment of the invention the measured value M to be transmitted exists in digital form within a value range of 0 to 3071 (=0h to 0B FFh≙0% to 75% PWM). It is particularly easy to add at 12, the above-described offset value Δ of 2 00h (≙⅛=12.5% PWM) to the measured value and store it in a 12-bit memory 14 for PWM generation. The value range of the 12-bit memory runs from 0 to 4095 (=0h to 0F FFh≙0 to 100% PWM).

In forming the sum of the measured value and offset value, a PWM value of 2 00h (≙⅛=12.5% PWM) cannot be exceeded and a PWM value of OD FFh (≙⅞=87.5% PWM) cannot be exceeded. For PWM generation, contents of the 12-bit memory are compared to the contents of a free-running 12-bit counter. If the memory contents are greater than the counter contents a logic HIGH level is output.

The PWM ratio is determined and evaluated in a receiver 16. In particular the offset value of ⅛=12.5% is again subtracted at 18. Consequently, the result exists again in adjusted form within the original value range of 0 to 3071. Interference pulses shorter than 12.5% PWM can be clearly detected and filtered out.

The described structure and method of operation of a sensor of the invention is particularly advantageous for position sensors, that is displacement and angle sensors, since they require very high degrees of resolution and precision particularly in special safety-critical applications in motor vehicles. Of course, sensors with the inventive structure can also be produced for other applications.

What is claimed is:

1. A position sensor for a motor vehicle comprising a PWM generator, which generates, as a sensor signal, a pulse-width modulated signal that varies as a function of a position to be measured in response to digitalized measured values, wherein a total position measuring range of the position sensor is subdivided into multiple, similar, sequentially-adjacent measuring sub-ranges, wherein in each sub-range the position sensor creates said digitalized measured values indicative of positions to be measured, wherein if the digitalized measured values were fed directly to the PWM generator without modification the PWM generator would convert the digitalized measured values to a PWM signal percentage modulated in only a portion of an entire percentage modulation range of 0 to 100%, said portion being near one of 0 and 100% modulation, but wherein the position sensor adds a fixed offset value to the digitalized measured values and then feeds the sum of the digitalized measured values and fixed offset value to said PWM generator so that said PWM generator converts the sum of the digitalized measured values and fixed offset value to a PWM signal such that the sum of a minimum possible digitalized measured value and the offset value converts to a pulse-width with a minimum percentage modulation that is substantially greater than 0%, and the sum of the maximum possible digitalized measured value and the offset value converts to a pulse-width with a maximum percentage modulation that is substantially less than 100%.

2. The position sensor of claim 1, wherein the pulse-width modulated signal is generated by a comparator which outputs a logic High level if the sum of the digital-sensor measured value and the offset value exceeds the contents of a free-running digital counter.

3. The position sensor of claim 1, wherein if the digitalized measured values were fed to the PWM generator without being summed with the offset value the PWM generator would create a PWM signal in which percentage pulse-width modulation would vary from approximately 0% to substantially less than 100%.

4. A position sensor of claim 3, wherein if the measured values were fed to the PWM generator without being summed with the offset value the PWM generator would create a PWM signal in which percentage pulse-width modulation varies from approximately 0% to approximately 75%.

5. The position sensor of claim 3, wherein the PWM generator, from the sum of the measured values and the offset value, creates a PWM signal in which a maximum percentage modulation is spaced about the same from 100% modulation as a minimum percentage modulation is spaced from 0% modulation.

6. A position-sensor system including the position sensor of claim 1, wherein is further included a receiver for receiving the pulse-width modulated signal, said receiver converting the pulse-width modulated signal to the sum of the digitalized measured values and the offset value, and then subtracting the offset value from the measured values to obtain demodulated signals for said sequentially-adjacent measuring sub-ranges and then combining said signals of said sequentially-adjacent measuring sub-ranges to have substantially error-free transitions and substantially no gaps between said signals of said sequentially-adjacent measuring sub-ranges.

* * * * *